(12) United States Patent
Naito et al.

(10) Patent No.: US 6,835,225 B2
(45) Date of Patent: Dec. 28, 2004

(54) NIOBIUM SINTERED BODY, PRODUCTION METHOD THEREFOR, AND CAPACITOR USING THE SAME

(75) Inventors: Kazumi Naito, Chiba (JP); Isao Kabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 15 days.

(21) Appl. No.: 10/258,122

(22) PCT Filed: Apr. 20, 2001

(86) PCT No.: PCT/JP01/03389

§ 371 (c)(1),
(2), (4) Date: Feb. 7, 2003

(87) PCT Pub. No.: WO01/82318

PCT Pub. Date: Nov. 1, 2001

(65) Prior Publication Data

US 2003/0172774 A1 Sep. 18, 2003

Related U.S. Application Data

(60) Provisional application No. 60/233,438, filed on Sep. 18, 2000.

(30) Foreign Application Priority Data

Apr. 21, 2000 (JP) ........................................ 2000-121244

(51) Int. Cl.[7] .................................................. B22F 3/00
(52) U.S. Cl. ............................ 75/245; 75/244; 361/523
(58) Field of Search .................... 75/244, 245; 361/523; 419/13

(56) References Cited

U.S. PATENT DOCUMENTS

| | | | |
|---|---|---|---|
| 4,084,965 A | 4/1978 | Fry | |
| 6,051,044 A | 4/2000 | Fife | |
| 6,115,235 A | 9/2000 | Naito | |
| 6,136,062 A * | 10/2000 | Loffelholz et al. | 75/369 |
| 6,540,810 B2 * | 4/2003 | Naito et al. | 75/255 |

FOREIGN PATENT DOCUMENTS

JP 55-157226 12/1980

OTHER PUBLICATIONS

International Search Report for PCT/JP01/03389 dated Oct. 31, 2001.

International Preliminary Examination Report for PCT/JP01/03389 dated Feb. 22, 2002.

* cited by examiner

Primary Examiner—Ngoclan T. Mai
(74) Attorney, Agent, or Firm—Sughrue Mion, PLLC

(57) ABSTRACT

A niobium sintered body which is prepared in such a manner that a niobium powder is sintered at a temperature of 500° C. to 2000° C. and allowed to stand at a maximum sintering temperature for 60 minutes to 150 minutes in the course of sintering. The niobium sintered body of the present invention is characterized in that a product (CV) of a capacitance (C) per unit mass and a forming voltage (V) is 90,000 $\mu$F·V/g or more, and a value obtained by dividing a product of a mean particle diameter ($D_{50}$) of a primary particle of said niobium powder and a leakage current (LC) by said CV is $5 \times 10^{-4}$ $\mu$m·$\mu$A ($\mu$F·V) or less. And there can be provided a well-balanced capacitor with respect to a preferably low leakage current value regardless of the large capacitance, that is, a highly reliable capacitance.

11 Claims, No Drawings

NIOBIUM SINTERED BODY, PRODUCTION METHOD THEREFOR, AND CAPACITOR USING THE SAME

CROSS-REFERENCE TO RELATED APPLICATIONS

This application is based on the provisions of 35 U.S.C. Article 111(a) with claiming the benefit of filing dates of U.S. provisional application Ser. No. 60/233,438 filed on Sep. 18, 2000 under the provisions of 35 U.S.C. 111(b), pursuant to 35 U.S.C. Article 119(e)(1).

TECHNICAL FIELD

The present invention relates to a niobium sintered body that can provide a preferable leakage current value in spite of the large capacitance, a production method therefor, and a capacitor using the sintered body.

BACKGROUND ART

Capacitors for use in electronic apparatus such as portable telephones and personal computers are required to be small in size and large in capacitance. Of those capacitors, a tantalum capacitor is preferably used, because the capacitance is large, not in proportion to the size, and the tantalum capacitor also has good characteristics. The tantalum capacitor usually employs a sintered body of tantalum powder as an anode. In order to increase the capacitance of the tantalum capacitor, it is necessary to increase the mass of the sintered body.

The increase in mass of the sintered body inevitably enlarges the shape of the capacitor, so that the requirement for a small-sized capacitor is not satisfied. One approach to solve these problems is a capacitor using a material which has a greater dielectric constant than tantalum. One material which has such a greater dielectric constant is niobium.

Japanese Laid-Open Patent Application No. 55-157226 discloses a method for producing a sintered element for a capacitor. This method comprises the steps of subjecting a niobium powder ranging from an agglomerate to fine particles with a particle diameter of 2.0 µm or less to pressure molding and sintering, finely pulverizing the molded sintered body, connecting a lead to the finely pulverized particles of the sintered body, and thereafter sintering the connected body again. However, the above-mentioned application does not describe detailed characteristics of the obtained capacitor.

U.S. Pat. No. 4,084,965 discloses a capacitor using a niobium powder with a particle diameter of 5.1 µm obtained from a niobium ingot through hydrogenation and pulverizing. However, the niobium sintered body has a high LC value, so that the serviceability of the niobium sintered body is regarded as poor.

The inventors of the present invention have already proposed to improve the leakage current characteristics (hereinafter referred to as an LC value) of niobium by partially nitriding the niobium and the other like manners (Japanese Laid-Open Patent Application No. 10-242004, U.S. Pat. No. 6,115,235). The LC value can be further decreased, for example, by increasing the sintering temperature in the preparation of the above-mentioned niobium sintered body. However, with the increase of sintering temperature, a product of a capacitance per unit mass of the obtained sintered body and a forming voltage to form a dielectric on the surface of the sintered body (hereinafter abbreviated as a CV value) becomes smaller. As a result, it is difficult to achieve the final goal, that is, to obtain a well-balanced niobium sintered body having a high CV value and a low LC value. When a capacitor is made from a niobium sintered body which has been prepared only with an aim to obtain a high CV value, there is a problem that a capacitor having an exceptionally large LC value will be produced.

Therefore, an object of the present invention is providing a niobium sintered body with a preferable leakage current value (LC value) in spite of the large capacitance, a production method therefor, and a capacitor using the above-mentioned sintered body.

DISCLOSURE OF THE INVENTION

The inventors of the present invention have intensively studied the above-mentioned problems, and found an unprecedented sintering method suitable for niobium powder used for capacitors where the niobium powder is allowed to stand at a maximum sintering temperature for predetermined time, and then accomplished the present invention.

Namely, the present invention provides the following niobium sintered body, a production method therefore, and a capacitor using the sintered body.

[1] A niobium sintered body prepared by sintering a niobium powder, wherein a product (CV) of a capacitance (C: $\mu$F/g) per unit mass and a forming voltage (V: volt(V)) is 90,000 $\mu$F·V/g or more, and a value obtained by dividing a product of a mean particle diameter ($D_{50}$: m) of a primary particle of the niobium powder and a leakage current (LC: $\mu$A/g) by the CV value is $5 \times 10^{-4}$ $\mu$m·A/($\mu$F·V) or less.

[2] The niobium sintered body as described in the above-mentioned aspect [1], wherein the niobium powder is partially nitrided.

[3] The niobium sintered body as described in the above-mentioned aspect [2], wherein a nitrogen content in the niobium powder is within a range of 20 mass ppm to 200,000 mass ppm.

[4] The niobium sintered body as described in the above-mentioned aspect [3], wherein a nitrogen content in the niobium powder is within a range of 500 mass ppm to 7,000 mass ppm.

[5] A method for producing a niobium sintered body comprising the step of sintering a niobium powder at high temperature, wherein the niobium powder is sintered at a temperature of 500° C. to 2,000° C. and allowed to stand at a maximum sintering temperature for 60 minutes to 150 minutes.

[6] A method for producing a niobium sintered body as described in the above-mentioned aspect [5], wherein the niobium powder is sintered at a temperature of 900° C. to 1500° C. and allowed to stand at a maximum sintering temperature for 80 minutes to 130 minutes.

[7] The method for producing the niobium sintered body as described in the above-mentioned aspect [5] or [6], wherein the niobium powder is granulated to have a primary particle with a mean particle diameter of 3 $\mu$m or less.

[8] The method for producing the niobium sintered body as described in the above-mentioned aspect [7], wherein the niobium powder is granulated to have a primary particle with a mean particle diameter of 3 $\mu$m to 0.1 $\mu$m.

[9] The method for producing the niobium sintered body as described in any one of the above-mentioned aspect [5] to [8], wherein the niobium powder is partially nitrided.

[10] The method for producing the niobium sintered body as described in the above-mentioned aspect [9], wherein a nitrogen content in the niobium powder is within a range of 20 mass ppm to 200,000 mass ppm.

[11] The method for producing the niobium sintered body as described in the above-mentioned aspect [10], wherein a nitrogen content in the niobium powder is within a range of 500 mass ppm to 7,000 mass ppm.

[12] A capacitor comprising an electrode comprising the niobium sintered body as described in any one of the above-mentioned aspect [1] to [4], a dielectric provided on the surface of the sintered body, and a counter electrode provided on said dielectric.

[13] The capacitor as described in the above-mentioned aspect [12], wherein the dielectric comprises niobium oxide formed by electrolytic oxidation.

[14] The capacitor as described in the above-mentioned aspect [12], wherein the counter electrode comprises at least one material selected from the group consisting of an electrolytic solution, an organic semiconductor, and an inorganic semiconductor.

[15] The capacitor as described in the above-mentioned aspect [14], wherein the counter electrode comprises the organic semiconductor, which is selected from the group consisting of an organic semiconductor comprising benzopyrroline tetramer and chloranil, an organic semiconductor comprising as the main component tetrathiotetracene, an organic semiconductor comprising as the main component tetracyanoquinodimethane, and an organic semiconductor comprising as the main component an electroconducting polymer prepared by doping a polymer having at least two repeat units represented by general formula (1) or (2) with a dopant:

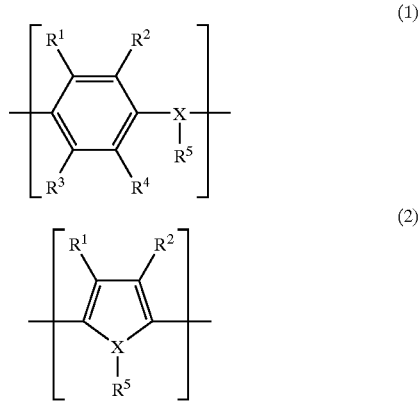

wherein $R^1$ to $R^4$ which may be the same or different each independently represents a hydrogen atom, an alkyl group having 1 to 6 carbon atoms, or an alkoxyl group having 1 to 6 carbon atoms; X represents an oxygen atom, a sulfur atom, or a nitrogen atom; and $R^5$, which is present only when X is a nitrogen atom, represents a hydrogen atom or an alkyl group having 1 to 6 carbon atoms, and $R^1$ and $R^2$, and $R^3$ and $R^4$ may be independently combined to form a ring.

[16] The capacitor as described in the above-mentioned aspect [15], wherein the organic semiconductor is at least one material selected from the group consisting of polypyrrole, polythiophene, and substituted derivatives thereof.

EMBODIMENT OF THE INVENTION

One embodiment for obtaining a sintered body according to the present invention will be explained.

A niobium powder serving as a raw material for preparing a sintered body may have a primary particle with a mean particle diameter of 3 μm or less, preferably within a range of 3 μm to 0.1 μm. When the mean particle diameter exceeds 3 μm, the niobium powder is not preferable because it is difficult to obtain a sintered body having high CV characteristics and low LC characteristics, that is one of the objects of the present invention.

The mean particle diameter herein used is a value $D_{50}$ (a particle diameter when the mass percentage reaches 50% by cumulative distribution by mass), which is measured using a particle size distribution measuring apparatus (trademark "Microtrac"). The niobium powder having such a mean particle diameter can be prepared, for example, by reducing potassium fluoroniobate with a sodium, by subjecting a hydride of a niobium ingot to pulverizing and dehydrogenation, or by subjecting niobium oxide to carbon reduction. When the niobium powder is prepared by subjecting a hydride of a niobium ingot to pulverizing and dehydrogenation, a niobium powder with a desired mean particle diameter can be obtained by adjusting the degree of hydrogenation in the niobium ingot and the pulverizing time by a pulverizer.

The niobium powder of the present invention may have the above-mentioned mean particle diameter, and preferably, partially nitrided. In this case, the nitrogen content of the nitrided powder is within a range of 20 mass ppm to 200,000 mass ppm (Hereinafter, the term "mass ppm" will be simply referred to as "ppm".).

A sintered body is prepared from the above-mentioned niobium powder, and a dielectric is formed on the surface of the sintered body to be described later. When the LC value is measured in an aqueous solution of phosphoric acid, it is preferable that the nitrogen content is 500 ppm to 7,000 ppm, and more preferably 500 ppm to 4,000 ppm in order to provide a niobium sintered body of which the leakage current value (LC) can be lowered in spite of the large capacitance. The nitrogen content herein used is the amount resulting from chemical nitriding, not from adsorption by the niobium powder and physical doping into the niobium powder.

The niobium powder can be nitrided by any of, or in combination of liquid nitriding, ion nitriding, and gas nitriding. Of these methods, the gas nitriding of niobium powder under a nitrogen gas atmosphere is preferred because the apparatus is simple and the operation is easy. For example, the gas nitriding can be achieved by allowing the aforementioned niobium powder to stand in an atmosphere of nitrogen gas. In this case, a niobium powder having a desired nitrogen content can be obtained by allowing the niobium powder to stand for 60 hours or less at temperatures of 2,000° C. or less. The processing time can be shortened by increasing the processing temperature.

The nitrogen content in the niobium powder can be controlled by verifying the temperature and the time for nitriding in preliminary experiments after measuring the particle diameters of particles to be subjected to nitriding.

The above-mentioned niobium powder may be granulated to have an adequate shape before use, or the granulated powder may be mixed with an appropriate amount of a niobium powder not undergoing granulation. Any conventional granulating methods can be used. For example, a niobium powder not undergoing granulation is allowed to stand at high temperatures under vacuum to cause agglomeration and solidification, and thereafter the agglomerate is subjected to disintegration. Alternatively, after a specific binder is mixed with a niobium powder not undergoing granulation, the resultant mixture is subjected to disintegration. In the latter case, the niobium powder and the binder may be kneaded using a solvent when necessary, and in this case, disintegration is carried out after the kneaded mixture is dried. As the binder, poly(vinyl alcohol) or acrylic resin is usually employed. The solvent may be selected from the group consisting of acetone, alcohols, esters such as butyl acetate, water, and the like.

The niobium powder thus granulated may have a mean particle diameter of 300 $\mu$m or less, preferably 200 $\mu$m or less, and more preferably in the range of 200 $\mu$m to 1 $\mu$m.

A sintered body of niobium powder according to the present invention can be produced by sintering the aforementioned niobium powder. For instance, the sintered body can be produced by subjecting the niobium powder to pressure molding to have a predetermined shape, and heating the pressure-molded article to temperatures of 500° C. to 2000° C., preferably 900° C. to 1500° C. under the pressure of $1.33 \times 10^{-4}$ to $1.33 \times 10^{2}$ Pa (Pascal), in a condition that a niobium sintered body is allowed to stand at a maximum sintering temperature for 60 minutes to 150 minutes, preferably for 80 minutes to 130 minutes.

Here, the maximum sintering temperature of niobium sintering body means maximum temperature in the range of the sintering temperature condition. The above-mentioned maximum sintering temperature may have a variation within a temperature control width of ±25° C. in the sintering apparatus, and may be determined by spontaneously controlling the temperature to have a wave form such as a square wave, pulse wave, or triangular wave within a temperature width of ±50° C. with respect to the preset maximum temperature.

The lower limit of the sintering temperature depends on the mean particle diameter of the niobium powder. For example, the smaller the mean particle diameter of the niobium powder, the lower the lower limit of the sintering temperature.

When the sintering temperature is changed with the mean particle diameter being the same, the sintered body produced at low sintering temperatures shows a high LC value although the CV value can increase. Such a sintered body cannot stand the practical use as a material for use in a capacitor. In the present invention, however, even if the sintering temperature is low, the niobium sintered body may be allowed to stand at a maximum sintering temperature for 60 minutes to 150 minutes, preferably for 80 minutes to 130 minutes, which is preferable to obtain niobium sintered body for use in a capacitor. As a result, the CV value can be increased to 90,000 $\mu$F·V/g or more and the LC value can be decreased. In other words, a value of $D_{50}$·LC/CV, that is, a measure of the LC properties in light of the mean particle diameter of the niobium powder and the CV value, can be decreased to $5 \times 10^{-4}$ $\mu$m·$\mu$A/($\mu$F·V) or less.

In general, the LC/CV value represents an LC value per unit surface area. When the niobium powders constituting the respective sintered bodies have different particle diameters, it is considered that the LC values of the sintered bodies are changed even though the surface areas of the niobium powders are the same. This is because the niobium powders are different in surface shape. The above-mentioned $D_{50}$·LC/CV value is a measure of the LC properties with the surface shape being taken into consideration. When a capacitor is produced using a sintered body having a $D_{50}$·LC/CV value of greater than $5 \times 10^{-4}$ $\mu$m·$\mu$A/($\mu$F·V), there is the possibility that the capacitor will show an exceptionally high LC value, which is not desired.

No niobium sintered body having such a high capacitance and a low LC as desired can be obtained when the niobium powder is allowed to stand at a maximum sintering temperature for less than 60 minutes, or more than 150 minutes.

The manufacture of a capacitor will now be described.

The capacitor of the present invention comprises said niobium sintered body as one electrode, a dielectric provided on a surface thereof, and a counter electrode provided on the dielectric.

A lead wire with an appropriate shape and length made of a metal with a valve action, such as niobium or tantalum, is integrally molded with the niobium powder in the course of the above-mentioned pressure molding of niobium powder so that a part of the lead wire may be inserted into the molded article. Namely, assembling is carried out so that the lead wire can serve as a leader from the sintered body.

It is preferable to employ a dielectric comprising niobium oxide as the dielectric of the capacitor according to the present invention. The niobium oxide used in the present invention is a general term for "an oxide of niobium". The number of oxygen atoms bonded to the niobium atom is not limited. For example, the oxides of niobium include $Nb_2O_5$, $NbO_2$, $NbO_x$ (X is in a range of 1.0 to 2.5).

The dielectric comprising niobium oxide can be easily obtained, for example, by subjecting the niobium sintered body serving as the one electrode to chemical treatment in an electrolyte. For the chemical treatment of the niobium electrode in an electrolyte, an aqueous solution of a protic acid, such as a 0.1% aqueous solution of phosphoric acid or sulfuric acid is commonly used. When the niobium electrode is subjected to chemical treatment in the electrolyte to obtain a dielectric comprising niobium oxide, an electrolytic capacitor can be provided with the niobium electrode serving as an anode.

The counter electrode for use in the capacitor of the present invention is not particularly limited. For example, at least one material (compound) selected from the group consisting of an electrolyte conventionally known in the aluminum electrolytic capacitor industry, an organic semiconductor, and an inorganic semiconductor is preferably employed.

Specific examples of the electrolyte include a mixed solution of dimethylformamide and ethylene glycol in which an electrolyte of isobutyltripropylammonium borotetrafluoride is dissolved in an amount of 5% by mass, and a mixed solution of propylene carbonate and ethylene glycol in which an electrolyte of tetraethylammonium borotetrafluoride is dissolved in an amount of 7% by mass.

Specific examples of the organic semiconductor include an organic semiconductor comprising benzopyrroline tetramer and chloranil, an organic semiconductor comprising as the main component tetrathiotetracene, an organic semiconductor comprising as the main component tetracyanoquinodimethane, and an organic semiconductor comprising as the main component an electroconducting polymer prepared by doping a polymer having at least two repeat units represented by the following general formula (1) or (2) with a dopant:

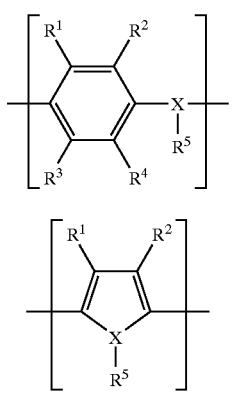

wherein $R^1$ to $R^4$ which may be the same or different each represents independently a hydrogen atom, an alkyl group having 1 to 6 carbon atoms, or an alkoxyl group having 1 to 6 carbon atoms; X represents an oxygen atom, a sulfur atom, or a nitrogen atom; and $R^5$, which is present only when X is a nitrogen atom, represents a hydrogen atom or an alkyl group having 1 to 6 carbon atoms, and $R^1$ and $R^2$, and $R^3$ and $R^4$ may be independently combined to form a ring. Any conventional dopant can be used as the above-mentioned dopant.

Examples of the polymer having a repeat unit represented by general formula (1) or (2) in number of 2 or more are polyaniline, polyoxyphenylene, polyphenylene sulfide, polythiophene, polyfuran, polypyrrole, polymethylpyrrole, and substituted derivatives and copolymers thereof. Of those polymers, polypyrrole, polythiophene, and the substituted derivatives thereof such as poly(3,4-ethylenedioxothiophene) are preferable.

Specific examples of the inorganic semiconductor include an inorganic semiconductor comprising as the main component lead dioxide or manganese dioxide, and an inorganic semiconductor comprising tri-iron tetroxide. Those semiconductors may be used alone or in combination.

When the organic or inorganic semiconductor having an electric conductivity of $10^{-2}$ S·cm$^{-1}$ to $10^3$ S·cm$^{-1}$ is used, the impedance of the obtained capacitor becomes smaller, so that the capacitance can be further increased at high frequencies.

When the counter electrode is solid, an electroconducting layer may be formed thereon to improve the electrical contact with an external lead such as a lead frame.

The electroconducting layer may be formed by solidification of an electroconducting paste, plating, metal deposition, or formation of a heat-resistant electroconducting resin film. As the electroconducting paste, silver paste, copper paste, aluminum paste, carbon paste, nickel paste, and the like are preferable. Those pastes may be used alone or in combination. When two or more electroconducting pastes are used, the pastes may be mixed together or laminated as separate layers. Once the electroconducting paste is applied, the paste is allowed to stand in the atmosphere or is heated for solidification. With respect to the plating, nickel plating, copper plating, silver plating, aluminum plating, and the like are used. For the metal deposition, aluminum, nickel, copper, silver, and the like can be employed.

To be more specific, a capacitor is constructed in such a manner that an aluminum paste and a silver paste are successively overlaid on the second electrode, and thereafter sealing is carried out using a material such as an epoxy resin.

The capacitor may be provided with a niobium or tantalum lead that is integrally molded and sintered together with the niobium sintered body, or welded later.

The capacitor of the present invention with such a structure as mentioned above can be used for various applications when the capacitor is sheathed with a resin mold, resin case, metallic case, resin dipping, or laminated film.

When the counter electrode is liquid, the capacitor composed of the electrodes and the dielectric is held in a can electrically connected to the counter electrode. In this case, the electrode using the niobium sintered body is designed to be externally led out via the niobium or tantalum lead, and be insulated from the can with an electrical insulating rubber or the like.

When the capacitor is produced using the niobium sintered body prepared by the method of the present invention, the capacitor with a large capacitance and good leakage current characteristics can be obtained.

BEST MODE FOR CARRYING OUT THE INVENTION

The present invention will now be explained more specifically with reference to the examples and comparative examples, but is not particularly limited to the following examples. In the following examples and comparative examples, a nitrogen content in a powder, a capacitance of the sintered body, a leakage current value (LC value) of the sintered body, and a capacitance of the capacitor processed into a chip capacitor are measured by the method described below.

(1) Nitrogen Content in the Powder

The amount of nitrogen in the powder was measured using an apparatus for determination of oxygen and nitrogen based on thermal conductivity, made by LECO corporation. The nitrogen content was expressed by the ratio of the amount of nitrogen to the weight of the powder separately measured.

(2) Capacitance of the Sintered Body

The sintered body was subjected to chemical treatment in a 0.1% aqueous solution of phosphoric acid at 80° C. for 200 minutes to form a dielectric on the surface of the sintered body. The above-mentioned sintered body immersed in a 30% aqueous solution of sulfuric acid and a tantalum electrode in the sulfuric acid solution were connected with an LCR measuring apparatus "LCR meter" made by Hewlett Packard Co., Ltd., to measure the capacitance at room temperature. The capacitance at 120 Hz was regarded as a capacitance of the sintered body.

(3) Leakage Current Value (LC value) of the Sintered Body

The dielectric was formed as mentioned above(2). Then, a direct current voltage that was 70% of the forming voltage applied to form the dielectric was continuously applied for 3 minutes between the above-mentioned sintered body immersed in a 20% aqueous solution of phosphoric acid and an electrode in the phosphoric acid solution at room temperature. The current value measured three minutes later was regarded as a leakage current value of the sintered body.

(4) Capacitance of the Capacitor Processed into a Chip Capacitor

The capacitance of the capacitor processed into a chip capacitor was a value measured at 120 Hz and at room temperatures using the LCR meter made by Hewlett Packard Co., Ltd. The leakage current value was a current value measured after the application of a rated voltage for 1 minute.

In the following examples and reference examples, each of the CV and LC values was an average value measured from 20 capacitors.

EXAMPLES 1 TO 3 AND COMPARATIVE EXAMPLES 1 TO 4

A niobium powder with a mean particle diameter of 1 μm obtained by subjecting potassium fluoroniobate to sodium reduction was allowed to stand at 1050° C under vacuum of $1.33 \times 10^{-4}$ Pa for 20 minutes. Thereafter, the niobium powder was granulated by disintegration to have a mean particle diameter of 150 μm. The granulated powder was allowed to stand at 300° C. in a stream of nitrogen for 1.5 hours, thereby obtaining a partially nitrided niobium powder with a nitrogen content of 1600 ppm by mass. The niobium powder thus obtained was molded together with a niobium lead wire with a diameter of 0.3 mm φ, so that a 1.8 mm×3.5 mm×4.5 mm molded article was produced in such a configuration that a part of the lead wire with a length of 3.5 mm was in the molded article and the other part with a length of 6 mm was outside. A plurality of these articles (20×18 units) were sintered at a maximum sintering temperature of 1150° C. under the application of a pressure of $1.33 \times 10^{-4}$ Pa, with the sintering time being changed as shown in TABLE 1, thereby obtaining sintered bodies. Each sintered body was subjected to chemical treatment in a 0.1% aqueous solution of phosphoric acid at 80° C. under the application of a voltage of 20 V for 200 minutes to deposit a dielectric of niobium oxide on the surface of the sintered body.

TABLE 1 shows the CV value, LC value, and $D_{50} \cdot LC/CV$ value of each of the sintered bodies. Further, a 1:1 mixture of a 30% aqueous solution of lead acetate and a 30% aqueous solution of ammonium persulfate was brought into contact with the dielectric 20 times at 40° C., whereby a mixture of lead dioxide (in an amount of 97% by mass) and lead sulfate was deposited as the counter electrode. Thereafter, a carbon paste and a silver paste were successively overlaid on the counter electrode, followed by sealing with an epoxy resin. Thus, a capacitor was produced. TABLE 3 shows the capacitance of each of the produced capacitors (with a size of 7.3 mm×4.3 mm×2.8 mm) and the LC value obtained by the application of a voltage of 6.3 V. Those values are average values taken from 20 capacitors in each Example, provided that the capacitors having LC values of more than 100 μA are omitted. The number of such omitted capacitors is also shown in TABLE 3.

EXAMPLES 4 TO 6 AND COMPARATIVE EXAMPLES 5 TO 8

A niobium powder with a mean particle diameter of 0.7 μm obtained from a hydride of a niobium ingot through pulverizing and dehydrogenation was allowed to stand at 950° C. under vacuum of $1.33 \times 10^{-4}$ Pa for 20 minutes. Thereafter, the niobium powder was granulated by disintegration to have a mean particle diameter of 120 μm. The granulated powder was allowed to stand at 300° C. in a stream of nitrogen for 1.5 hours, thereby obtaining a partially nitrided niobium powder with a nitrogen content of 2000 ppm by mass. The nitrided niobium powder was molded in the same manner as in Comparative Example 1, and sintered at a maximum sintering temperature of 1050° C. under the application of a pressure of $1.33 \times 10^{-4}$ Pa, with the sintering time being changed as shown in TABLE 1, thereby obtaining sintered bodies. Each sintered body was subjected to chemical treatment in the same manner as in Comparative Example 1, and the CV value, LC value, and $D_{50} \cdot LC/CV$ value were measured. TABLE 1 shows the above-mentioned values. The procedure of bringing a 1:1 mixture of a 10% aqueous solution of ammonium persulfate and a 0.5% aqueous solution of anthraquinone sulfonic acid into contact with the dielectric, and exposing the dielectric to a pyrrole gas was repeated at least 5 times, whereby a counter electrode of polypyrrole was deposited. Then, a capacitor was produced in the same manner as in Comparative Example 1. TABLE 3 shows various values of the capacitor.

COMPARATIVE EXAMPLES 9 TO 12

A sintered body and a capacitor were produced in the same manner as in Comparative Example 1 except that the maximum sintering temperature was changed as shown in TABLE 2. TABLE 2 and TABLE 4 show various values of each of the sintered bodies and the capacitors.

TABLE 1

| | Sintering Time (min) | CV (μF · V/g) | LC (μA/g) | $D_{50} \cdot LC/CV$ (μm · μA/(μF · V)) |
|---|---|---|---|---|
| Comparative Example 1 | 20 | 95000 | 60 | $6.3 \times 10^{-4}$ |
| Comparative Example 2 | 40 | 97000 | 50 | $5.1 \times 10^{-4}$ |
| Example 1 | 80 | 97000 | 45 | $4.6 \times 10^{-4}$ |
| Example 2 | 100 | 95000 | 30 | $3.1 \times 10^{-4}$ |
| Example 3 | 130 | 90000 | 30 | $3.3 \times 10^{-4}$ |
| Comparative Example 3 | 200 | 82000 | 25 | $3.0 \times 10^{-4}$ |
| Comparative Example 4 | 400 | 60000 | 20 | $3.3 \times 10^{-4}$ |
| Comparative Example 5 | 20 | 140000 | 135 | $6.7 \times 10^{-4}$ |
| Comparative Example 6 | 40 | 152000 | 110 | $5.1 \times 10^{-4}$ |
| Example 4 | 80 | 150000 | 90 | $4.2 \times 10^{-4}$ |
| Example 5 | 100 | 145000 | 80 | $3.8 \times 10^{-4}$ |
| Example 6 | 130 | 120000 | 75 | $4.4 \times 10^{-4}$ |
| Comparative Example 7 | 200 | 89000 | 70 | $5.5 \times 10^{-4}$ |
| Comparative Example 8 | 400 | 80000 | 65 | $5.7 \times 10^{-4}$ |

TABLE 2

| | Maximum Sintering Temp (° C.) | CV (μF · V/g) | LC (μA/g) | $D_{50} \cdot LC/CV$ (μm · μA/(μF · V)) |
|---|---|---|---|---|
| Comparative Example 9 | 950 | 130000 | 290 | $2.2 \times 10^{-3}$ |
| Comparative Example 10 | 1050 | 110000 | 130 | $1.2 \times 10^{-3}$ |
| Comparative Example 11 | 1250 | 73000 | 25 | $3.4 \times 10^{-4}$ |
| Comparative Example 12 | 1350 | 45000 | 10 | $2.2 \times 10^{-4}$ |
| Comparative Example 1 | 1150 | 95000 | 60 | $6.3 \times 10^{-4}$ |

TABLE 3

| | Capacitance (μF) | LC (μA) | The Number of Samples with LC of more than 100 μA |
|---|---|---|---|
| Comparative Example 1 | 420 | 35 | 1/20 |
| Comparative Example 2 | 430 | 32 | 1/20 |
| Example 1 | 432 | 15 | 0/20 |
| Example 2 | 426 | 10 | 0/20 |
| Example 3 | 400 | 13 | 0/20 |
| Comparative Example 3 | 355 | 11 | 0/20 |

TABLE 3-continued

| | Capacitance (μF) | LC (μA) | The Number of Samples with LC of more than 100 μA |
|---|---|---|---|
| Comparative Example 4 | 260 | 9 | 0/20 |
| Comparative Example 5 | 624 | 55 | 1/20 |
| Comparative Example 6 | 672 | 49 | 1/20 |
| Example 4 | 668 | 25 | 0/20 |
| Example 5 | 640 | 20 | 0/20 |
| Example 6 | 530 | 18 | 0/20 |
| Comparative Example 7 | 382 | 18 | 0/20 |
| Comparative Example 8 | 347 | 15 | 0/20 |

TABLE 4

| | Capacitance (μF) | LC (μA) | The Number of Samples with LC of more than 100 μA |
|---|---|---|---|
| Comparative Example 9 | 560 | 62 | 2/20 |
| Comparative Example 10 | 481 | 58 | 2/20 |
| Comparative Example 11 | 309 | 10 | 0/20 |
| Comparative Example 12 | 188 | 8 | 0/20 |
| Comparative Example 1 | 420 | 35 | 1/20 |

When the results of Comparative Example 1 are compared with those of Comparative Example 9 to 12, it is found that as the sintering temperature increases, the CV value decreases although the LC value becomes better, which drastically lowers the capacitance of the capacitor. As is apparent from the values concerning the capacitors in Examples 1 to 6, the well-balanced capacitors with respect to the LC value and the CV value, more specifically, the capacitors including no capacitor with an LC value of more than 100 μA and having a capacitance of 400 μF or more can be obtained when the sintering is carried out at a maximum sintering temperature for 80 minutes to 130 minutes, and using a niobium powder provided with a CV value of 90,000 μF·V/g or more, and a $D_{50}$·LC/CV value of $5 \times 10^{-4}$ μm·μA/(μF·V) or less.

INDUSTRIAL APPLICABILITY

The niobium sintered body of the present invention is completed after being sintered at a temperature of 500° C. to 2000° C. and allowed to stand at a maximum sintering temperature for 60 minutes to 150 minutes in the course of preparation of the sintered body and characterized in that a product (CV) of a capacitance (C) per unit mass and a forming voltage (V) is 90,000 μF·V/g or more, and a value obtained by dividing a product of a mean particle diameter ($D_{50}$) of a primary particle of said niobium powder and a leakage current (LC) by said CV is $5 \times 10^{-4}$ μm·μA/(μF·V) or less.

The capacitor comprising niobium sintered body of the present invention can be a well-balanced capacitor with respect to the capacitance and the LC value, that is, a highly reliable capacitor.

What is claimed is:

1. A niobium sintered body prepared by sintering a niobium powder, wherein a product (CV) of a capacitance (C: μF/g) per unit mass and a forming voltage (V: volt(V)) is 90,000 μF·V/g or more, and a value obtained by dividing a product of a mean particle diameter ($D_{50}$: μm) of a primary particle of the niobium powder and a leakage current (LC: μA/g) by the CV value is $5 \times 10^{-4}$ μm·μA/(μF·V) or less.

2. The niobium sintered body as claimed in claim 1, wherein the niobium powder is partially nitrided.

3. The niobium sintered body as claimed in claim 2, wherein a nitrogen content in the niobium powder is within a range of 20 mass ppm to 200,000 mass ppm.

4. The niobium sintered body as claimed in claim 3, wherein a nitrogen content in the niobium powder is within a range of 500 mass ppm to 7,000 mass ppm.

5. A capacitor comprising an electrode comprising a niobium sintered body prepared by sintering a niobium powder, wherein a product (CV) of a capacitance (C: μF/g) per unit mass and a forming voltage (V: volt(V)) is 90,000 μF·V/g or more, and a value obtained by dividing a product of a mean particle diameter ($D_{50}$: μm) of a primary particle of the niobium powder and a leakage current LC: μA/g by the CV value is $5 \times 10^{-4}$ μm·μA/μF·V) or less, a dielectric provided on a surface of the sintered body, and a counter electrode provided on the dielectric.

6. The capacitor as claimed in claim 5, wherein the dielectric comprises niobium oxide formed by electrolytic oxidation.

7. The capacitor as claimed in claim 5, wherein the counter electrode comprises at least one material selected from the group consisting of an electrolytic solution, an organic semiconductor, and an inorganic semiconductor.

8. The capacitor as claimed in claim 7, wherein the counter electrode comprises the organic semiconductor, which is selected from the group consisting of an organic semiconductor comprising benzopyrroline tetramer and chloranil, an organic semiconductor comprising as the main component tetrathiotetracene, an organic semiconductor comprising as the main component tetracyanoquinodimethane, and an organic semiconductor comprising as the main component an electroconducting polymer prepared by doping a polymer having at least two repeat units represented by general formula (1) or (2) with a dopant:

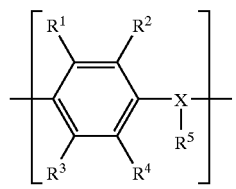

(1)

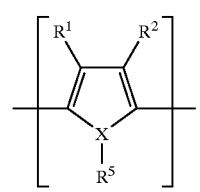

(2)

wherein $R^1$ to $R^4$ which may be the same or different each independently represents a hydrogen atom, an alkyl group having 1 to 6 carbon atoms, or an alkoxyl group having 1 to 6 carbon atoms; X represents an oxygen atom, a sulfur atom, or a nitrogen atom; and $R^5$, which is present only when X is a nitrogen atom, represents a hydrogen atom or an alkyl group having 1 to 6 carbon atoms, and $R^1$ and $R^2$, and $R^3$ and $R^4$ may be independently combined to form a ring.

9. The capacitor as claimed in claim 8, wherein the organic semiconductor is at least one material selected from the group consisting of polypyrrole, polythiophene, and substituted derivatives thereof.

10. The niobium sintered body as claimed in claim 1, wherein the niobium powder is granulated to have a primary particle with a mean particle diameter of 3 μm or less.

11. The niobium sintered body as claimed in claim 1, wherein the niobium powder is granulated to have a primary particle with a mean particle diameter of 3 μm to 0.1 μm.

* * * * *